United States Patent [19]

Banks

[11] Patent Number: 4,563,876
[45] Date of Patent: Jan. 14, 1986

[54] LINEAR OUTPUT NITINOL ENGINE

[76] Inventor: Ridgway M. Banks, 7411 Park Vista, El Cerrito, Calif. 94530

[21] Appl. No.: 704,660

[22] Filed: Feb. 25, 1985

[51] Int. Cl.⁴ .............................................. F03G 7/06
[52] U.S. Cl. ...................................................... 60/527
[58] Field of Search ........................... 60/527, 528, 529

[56] References Cited

U.S. PATENT DOCUMENTS 4,450,686  5/1984  Banks .................................... 60/527

Primary Examiner—Allen M. Ostrager
Attorney, Agent, or Firm—Bruce & McCoy

[57] ABSTRACT

A linear output heat engine for developing energy from elements of nitinol wire. The wires are secured between parallel linkage levers which are reciprocated between hot and cold fluid baths causing the levers to actuate whereby linear reciprocating energy is extracted from the levers.

5 Claims, 7 Drawing Figures

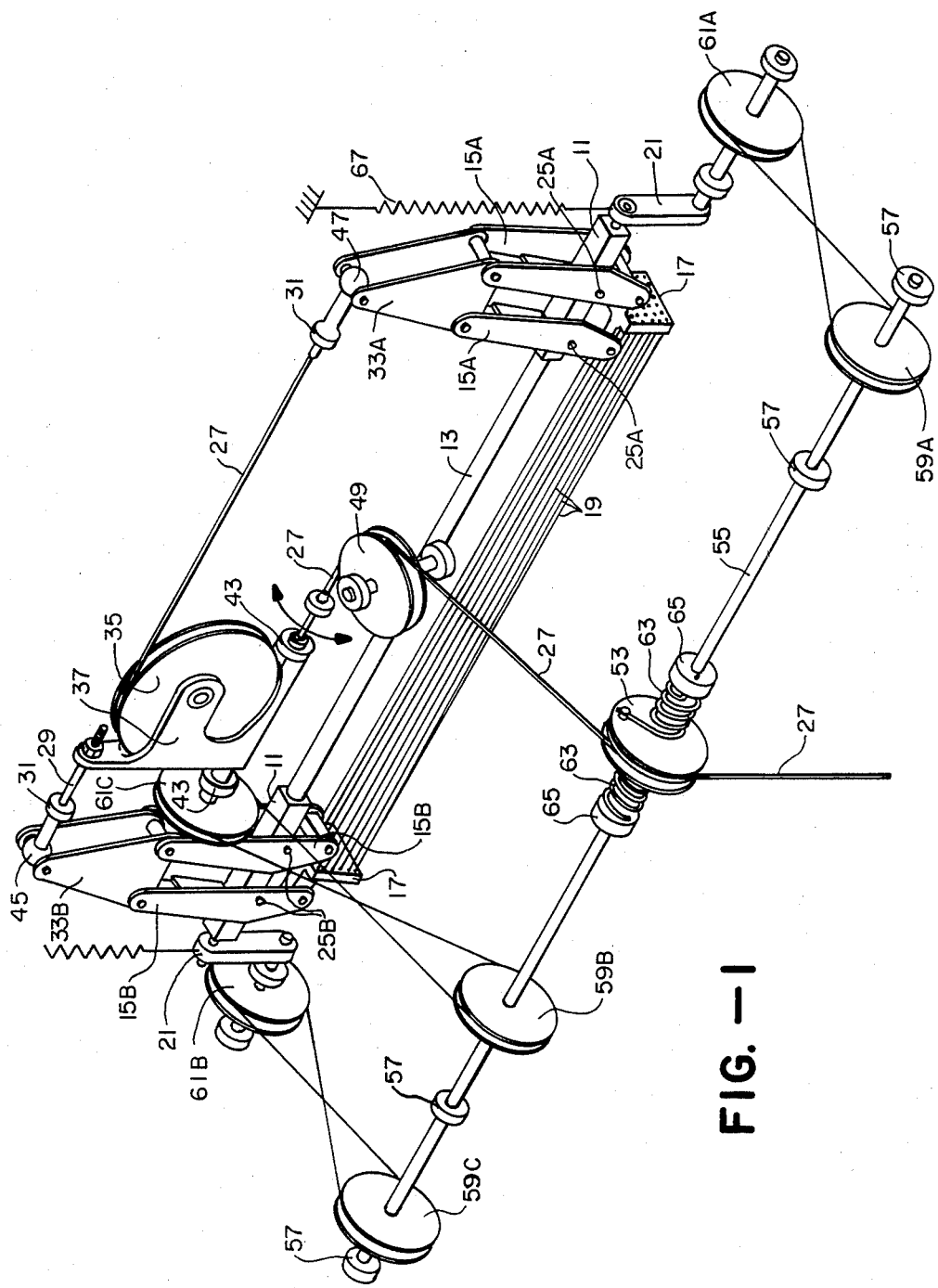
FIG. —1

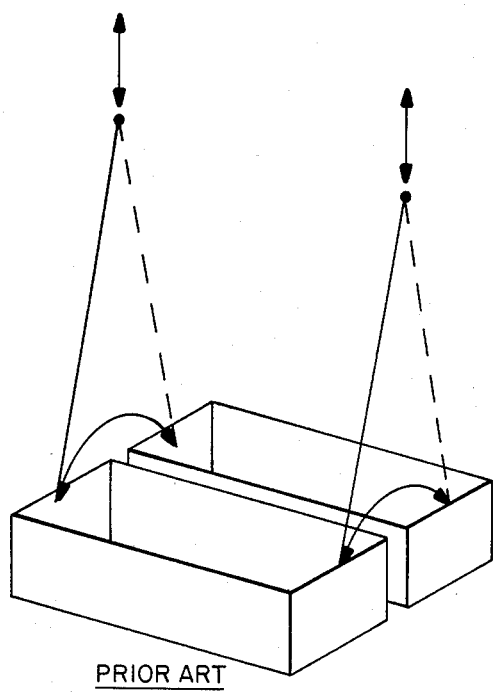
PRIOR ART
FIG.—2
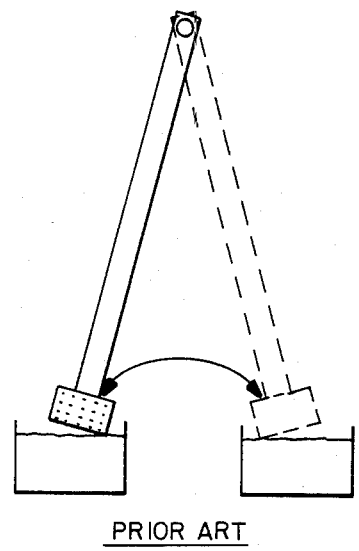
PRIOR ART
FIG.—3
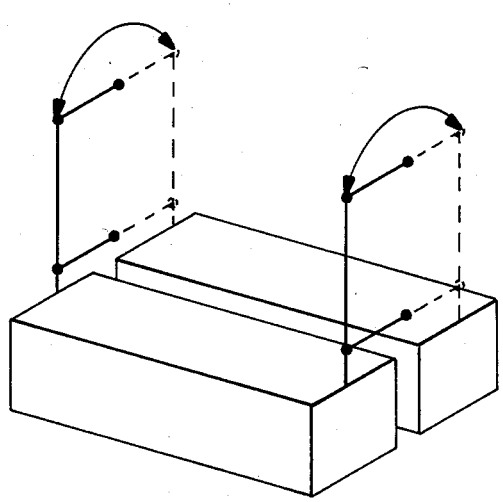
FIG.—4
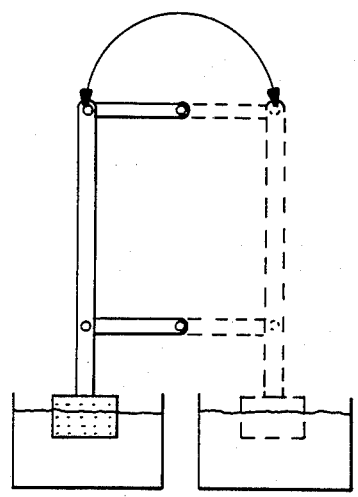
FIG.—5

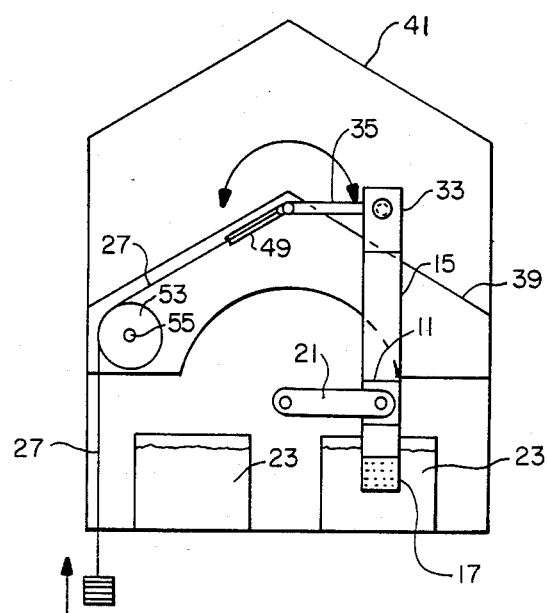
FIG.—6
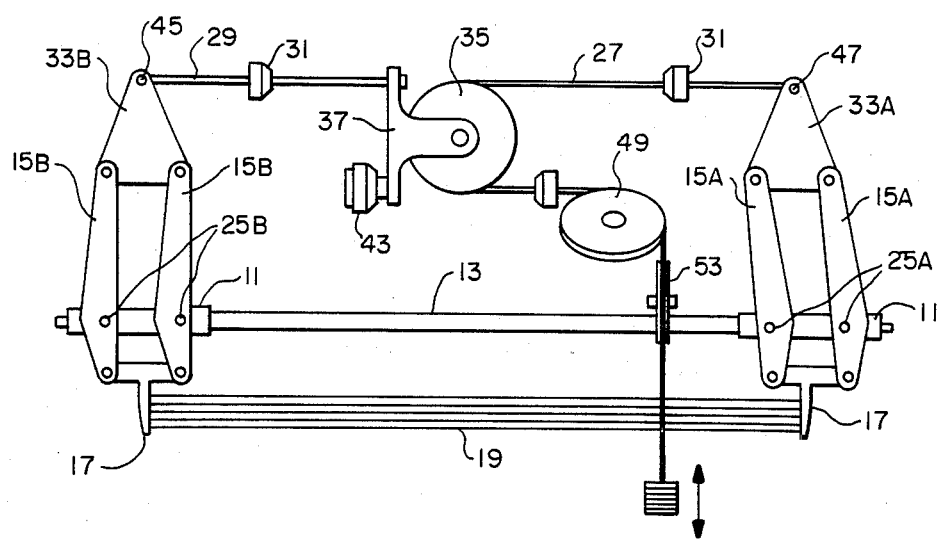
FIG.—7

LINEAR OUTPUT NITINOL ENGINE

BACKGROUND OF THE INVENTION

1. Field of the Invention

The present invention relates to heat engines and more particularly to a nitinol powered heat engine which produces a linear output for doing work.

2. Description of the Prior Art

The inventor of the present invention is also the inventor of the Banks Engine, U.S. Pat. No. 3,913,326, for Energy Conversion System, issued Oct. 21, 1975, which was the first proven reliable nitinol engine. The "Background Of The Invention" section of that patent sets forth in part the status of the prior art at the time of that invention. The "Summary of the Invention" section of that patent describes the thermodynamic working material as a thermally responsive memory material, such as nitinol, which is used to power the present invention. The thermally responsive materials which demonstrate these characteristics have come to be known as the shape memory effect class of materials.

Subsequent to the development of the original engine, the present inventor developed an improved version of an engine to extract the tensile energy of straight nitinol wire. That engine is disclosed in the U.S. Pat. No. 4,257,231, for Heat Engine, issued Mar. 24, 1981. The "Background Of The Invention" section of that patent sets forth in part the status of the art which had developed at the time of that invention. The "Summary of the Invention" section of that patent describes the problems with extracting energy from straight wires of nitinol or any other thermally responsive shape memory effect material.

While the Heat Engine patent discloses the first practical machine for extracting energy from straight nitinol wires, the power takeoff mechanism was complicated, arbitrary in the rate and extent of displacement imposed on the nitinol power elements, and ultimately proved difficult in scaling up for useful energy extraction. The machine also had large inertia in the moving parts which limits its speed and contributes to inefficiency of operation.

SUMMARY OF THE INVENTION

Continued study of nitinol engine designs by the inventor has defined three areas of engine design in which improvements have created substantial beneficial results, and these improvements include new solutions to several of the problems in extracting useful work from shape memory effect materials. These three areas are:

I. Thermal Efficiency—particular attention has been directed to (1) reducing the parasitic thermal losses due to fluid carry-over from bath to bath by nitinol wires and their support means; and (2) optimizing the time spent with the wires actually immersed in the heating and cooling media; reducing the time spent moving the wires between the hot and cold water baths which decreases the time between the heating and cooling events.

II. Mechanical Efficiency—efforts have been directed to overcoming the mismatch between the shape recovery behavior of nitinol wires and the kinematics of conventional linear to rotary motion of mechanical transducers (e.g. cranks) and at the same time for permitting full delivery of mechanical energy developed in the nitinol wires to the power takeoff system. This area of concern has often been the central cause of failure in linear tension engine designs. It has been the solution, as in the present invention, to overcome the problem by interposing springs between the nitinol wires and the power takeoff mechanism. This arrangement, however, runs the risk of wasting some part of the power stroke through incomplete delivery by the end of the power stroke of the energy that was generated by the wire on heating. Any residual mechanical stresses left in the springs when the nitinol wire is cooled will be irretrievably lost to debit the output of that cycle, unless such springs are fully recovered at the end of the stroke which is the case in the present invention.

III. Mechanical Accommodation—nitinol tends to change its dimensions and shape recovery characteristics due to: (1) transient changes in the prevailing conditions of the cycle, i.e., stress, strain, operating temperatures; and (2) changes in the metal over time due to repeated cycling or training of the metal. Therefore, engine designs based on assumed rigorous displacement parameters for the working material (as most engine designs are) are likely to run into problems if the behavior of the working material deviates significantly from the assumed parameters. Specifically, the length of the working strokes may increase or decrease according to available temperature differences (delta T) at any given time, or the working element may—over time—acquire quite different thermal mechanical properties as a result of thermal cycling, stress, and strain. What is required is a set of conditions in a machine where the nitinol can perform its work cycle in as broad a range of mechanical conditions as possible and without restraint by externally imposed cycle parameters.

The nitinol engine design of the present invention addresses these criteria by providing means for deriving net mechanical work from displacements in the nitinol wire which may vary in extent of elongation on cooling, in extent of contraction on heating (or both), and which disassociates the work delivery of the nitinol wire from the cycling dynamics of the engine.

Additionally, in simplifying a nitinol engine for the purpose of doing work, such as pumping water, design can be further optimized by providing simply a reciprocating linear motion communicated to a positive displacement (piston or diaphragm) pump. In addition to the higher efficiencies achieved by the new mechanical design of the apparatus, that is the principal achievement of the present invention.

Thus, the present invention is a linear output nitinol engine comprising in basic part an external framework which provides parallel baths in the lower end thereof and an upper support structure for housing and supporting some of the required machinery.

The machine includes a reciprocating mechanism for moving the nitinol wires between the baths. The mechanism has a pair of pivot blocks secured to the opposite ends of a compression member. A pair of identical pulley linkage levers are secured to each of the pivot blocks and a loom is secured to the lower end of each of the pair of linkage levers. A multiplicity of nitinol wires are strung between the looms.

The machine is provided with a power takeoff block secured to the top ends of each of the pair of linkage levers while a pair of throw over arms support the opposite ends of the compression member. These throw over arms are journalled to reciprocate the looms disposed on the lower ends of the parallel linkage levers alternatively into and out of the parallel baths.

A pulley is journalled in a rotatable bracket which is mounted on the upper support structure. The bracket and pulley are arranged to reciprocate in a matter whereby a tangent line to the top of said pulley continually intersects a power takeoff point on each of the power takeoff blocks.

A means is provided to act as a power takeoff. This includes a tension member disposed to lie on the above-described tangent line which is secured between the power takeoff point on one of said power takeoff blocks and the pulley supporting bracket. A flexible tension member is secured to and extends from the power takeoff point on the other of the power takeoff blocks and is routed around the flip-flop pulley in the bracket to said load.

A timing means is provided for synchronizing the throw over arms and the flip-flop of the pulley as well as a means for storing some energy extracted from the power takeoff tension member. This stored energy is utilized for biasing the timing means and to actuate the throw over arms.

OBJECTS OF THE INVENTION

It is therefore an important object of the present invention to provide a nitinol powered heat engine which delivers a linear output.

It is also an object of the present invention to provide a nitinol heat engine with a simplified mechanical power takeoff which permits a stronger structure to be employed to produce larger amounts of net work than was heretofore possible.

It is another object of the present invention to provide a nitinol heat engine having a simplified mechanism for keeping the parts of the engine in synchronization.

It is a further object of the present invention to provide a nitinol heat engine which exposes the nitinol wire elements into the temperature change mediums in series of units.

It is still another object of the present invention to provide a nitinol heat engine which can be operated by a single or a very large number of nitinol wires in the same physical embodiment of the engine without the need to change the size of the supporting structure for the nitinol wires.

It is yet a further object of the present invention to provide a variable stroke nitinol heat engine.

Other objects of the present invention will become apparent when the description of the preferred embodiment as described herein is considered in conjunction with the accompanying drawings.

DESCRIPTION OF THE DRAWINGS

FIG. 1 is a perspective view of a preferred embodiment of the working parts (less supporting structure) of the present invention;

FIG. 2 is a schematic diagram of the operation of the reciprocating hinged elements of the Heat Engine of U.S. Pat. No. 4,257,231;

FIG. 3 is a schematic diagram of the angulated approach of the assembly of nitinol wires of the Heat Engine of U.S. Pat. No. 4,257,231 to one of its fluid baths;

FIG. 4 is a schematic diagram of the operation of the assembly of nitinol wires and their reciprocating support structure of the present invention;

FIG. 5 is a schematic diagram of the orthogonal and parallel submersion of the assembly of nitinol wires of the present invention in one of its fluid baths;

FIG. 6 is a schematic diagram of an end elevation of the present invention; and

FIG. 7 is a side elevation of the preferred embodiment of the working parts (less supporting structure) of the present invention.

DESCRIPTION OF THE PREFERRED EMBODIMENT

The present invention is a heat engine utilizing thermally responsive elements of a shape memory material such as disclosed in my prior U.S. Pat. No. 3,913,326. In particular, the preferred embodiment of the present invention is particularly adapted to use with nitinol wire due to the extensive knowledge of that metal's physical properties. Other thermally responsive shape memory effect materials may of course be utilized in the present invention.

The linear output nitinol engine of the present invention incorporates the same basic thermal cycling principal as the Heat Engine described in my U.S. Pat. No. 4,257,231. However, numerous improvements and changes have resulted in a totally new machine which produces useful power outputs with a much simplified construction of the mechanical apparatus.

The similar mode of operation of the present invention to my Heat Engine includes cycling a multiplicity of parallel nitinol wires into different temperature fluid baths where they elongate and shorten. In my previous design, the power takeoff element which extracts energy from the lengthening and shortening of the wires has been supported at the lower ends of a pair of essentially vertically reciprocating hinged pendulum elements as illustrated in FIG. 2 hereof. The lower ends of the pendula are moved horizontally back and forth between the two rectangular baths while the whole of the pendula are also reciprocated up and down to alternately immerse the lower ends of the pendula in the different temperature baths. Because of the tendency of these pendula of my prior design to approach the surfaces of the water baths at an angle (as illustrated in FIG. 3 hereof), whereby successively different numbers of wires would be entering the baths at any one time, elaborate means would have had to have been provided to prevent shock loading of the first wire (for example) entering the heating bath for the brief period of time when it would be the only wire of the entire set doing work on the mechanical power takeoff system.

In the new design of the present invention, the wires do not enter the water at an angle because the wire supporting means are constrained to remain vertical by being pivoted around a pair of fulcra at both the top and bottom of the wire support structure so that the pendulum effect is eliminated. In each step or position in the cycle, the wire support structure is maintained in parallel relation to the surface of the baths throughout the cycle. This is illustrated in FIGS. 4 and 5. As a result, parallel rows of wire enter the bath simultaneously and a simple structure is provided to accommodate the effects of the temperature change on successive rows of the wires without shock loading.

Thus, the preferred embodiment of the linear output nitinol engine of the present invention includes an external framework for the engine which supports a pair of parallel baths in the lower end thereof between which the energy producing nitinol wires are cycled as described in my U.S. Pat. No. 4,257,231. The framework also includes an upper support structure for supporting a portion of the power takeoff mechanism.

A reciprocating mechanism called the wire transport mechanism is shown in FIG. 1 which cycles the wires between the baths. It includes a pair of pivot blocks 11 which are secured to opposite ends of the compression member 13. A first four bar linkage mechanism is secured to each of the pivot blocks. These include two pair of identical parallel linkage levers 15 journalled between their ends to the pivot blocks and which support a wire bridle or loom 17 at their lower ends below the compression member 13.

A multiplicity of nitinol wires 19 are strung between the looms 17 which form part of the first four bar linkages and support the nitinol wires in parallel horizontal rows of wires. The looms are tapered and form a depending cantilever support for the wires. Each loom is also formed as thin as possible to reduce thermal contamination of the two baths.

Because the wires 19 must be able to strain and recover strain in the exclusively axial mode, the wire support looms 17 must be mounted so that the motion of the opposing (vertical) loom remains parallel. This is accomplished by means of a second four bar linkage mechanism which is schematically shown in part in FIG. 6. The actual arrangement is not quite so obvious. The lower linkage bars, which are throw over arms 21, flip-flop and are readily apparent. They are the two cranks which transport the wire looms between the fluid baths 23. The upper linkage bars however are comprised of several components which will be described hereinafter.

The two paired lever systems of the first four bar linkage sets 15A and 15B which support the looms are disposed in fixed spaced relation to each other and are supported by a lightweight tubular compression member 13. One lever system 15A at one end of the compression member is permitted to oscillate around a pair of primary pivot points 25A which are perpendicular to the compression member. Shortening of the nitinol wires 19 on heating (the power stroke) pulls the wire looms 17 together and causes the mobile levers 15 to swing apart in the upper end of the system above the pivot points 25 thereby pulling on the power takeoff or output cable 27.

The other of the paired lever systems 15B, at the opposite end of the compression member from the oscillating lever system 15A, is identical except that there is little or virtually no motion around the primary pivot points 25B in the lever system during the power stroke. In the preferred embodiment, the stationary lever system 15B is a mirror image of the first 15A to compensate for flexure in the compression member 13. However, if a truly rigid structure could be employed for the compression member, it would not be necessary to provide a lever system 15B on the fixed non-moving end. In order to lighten the weight of the dynamic portion of the machinery, the tubular compression member 13 is employed with the compensating lever system 15B.

Both lever systems are interconnected by cables 27, 29 at the top, which are secured with swivel connections 31, to power takeoff blocks 33 which are pivotally connected to the top ends of each of the pair of linkage levers 15A and 15B. The moving or power takeoff output cable 27 is secured to the power takeoff block which is engaged with the top ends of the levers 15A which oscillate during the cycling of the nitinol wires.

The power output cable 27 passes around a pulley 35 mounted in a rotatable housing 37 which flip-flops from side to side.

A tension member 29 is attached to the back of the rotatable pulley housing 37 in line or coaxial with the power takeoff cable 27. This member is in tension only, and constantly, and for this reason can be a cable. In the preferred embodiment, it is connected to a threaded member to permit adjustment of the active working stroke of the nitinol power element, the wires, with respect to displacement applied to the timing means described hereinafter.

The flip-flop pulley 35 is mounted on an internal bridge 39 in the support structure 41 of the machine. The bridge 39 spans the fluid baths 23 between the linkage levers 15 and above the compression member 13. It is secured at its ends to the side walls of the support structure 41. The flip-flop pulley is thereby supported independent of the reciprocating wire transport mechanism midway between the baths. The outside housing support structure 41 is in the form of a partial simple doghouse (like Snoopy's) with rectangular sides, a peaked roof, and pentagon end walls. It squats over the operating elements of the preferred embodiment to support some of the pulleys and bearings.

The power takeoff cable pulley 35 is journalled in a flip-flop bracket 37 mounted on the peak of the internal bridge 39. The lower end of the bracket 37 is mounted in a pair of bearings 43 which are secured to the bridge structure 39 and which are aligned on an axis which is parallel to the cylindrical wall of generation formed by the track of the power takeoff cable 27 and the non-moving cable 29. The pulley 35 is designed so that a tangent line to the top of the pulley mounted in the rotatable bracket continually intersects the coaxial power takeoff points on both of the power takeoff blocks 33, which are mounted at the tops of the parallel linkages 15A and 15B, while the pulley bracket 37 flip-flops.

The pair of throw over arms 21 which support the opposite ends of the compression member 13 are journalled to reciprocate the wire looms 17, which are disposed on the lower ends of the parallel linkage levers 15A and 15B, into and out of the parallel different temperature baths 23. As schematized in FIG. 5, transfer of the wires from bath to bath is effected by a second four bar linkage with the driven throw over arms 21 constituting the lower end or lower throw over bars of the linkage. The flip-flop pulley 35 and the two cables engaged with it 27, 29 are the upper linkage bar or throw over bars of the second four bar linkages. While the pulley is located between the two paired lever systems 15A and 15B, and forms only a single upper throw over linkage bar of the four bar system, it interconnects to the upper ends of the outer vertical bar of the four bar system through the takeoff and non-moving cables. The rotation of the throw over arms and the flip-flop pulley bracket are synchronized by a timing means.

The power takeoff means includes the fixed length cable 29 which is secured between the power takeoff point 45 on the fixed power takeoff block 33B and the pulley supporting bracket 37 and aligned with the above-described tangent line to the pulley. The power takeoff means also includes a second tension member which is the power output cable 27 that is secured to the power takeoff point 47 on the reciprocating power takeoff blocks 33A and extends around the flip-flop pulley 35 to the load. The power takeoff cables are provided with swivels 31 to prevent any biasing torsion from developing in the system. In order to connect the power output of the machine to the load, the power takeoff cable 27 is routed around an idler pulley 49 which is journalled on the bridge 39 of the support structure.

A means is provided for storing some energy extracted from the power takeoff tension member for biasing the timing means and to actuate the wire transport mechanism. This is done by further routing the power takeoff cable 27 completely around another idler pulley 53 called the driver wheel which extracts a small portion of the output power and puts the energy into dynamic storage. In one of its simplest forms, dynamic energy storage is effected by winding a spring.

The timing means includes a distributor or synchronizing shaft 55 which interconnects the two throw over arms 21 and the flip-flop pulley. The shaft is supported by bearings 57 mounted on the doghouse support structure and is powered by the dynamic energy storage system. The distributor shaft 55 includes at least three pulley transmissions or gear trains which interconnect the two throw over arms and the flip-flop pulley. In a preferred embodiment, a single timing shaft 55 is utilized which runs the length of the engine. It is provided with three pulleys 59A, 59B, 59C which power three corresponding pulleys 61A, 61B, 61C mounted on the wire transport mechanism; two on the throw over arms 61A and 61B and one on the suppport shaft of the flip-flop pulley bracket 61C. The driving interconnection between the three pulleys powers and times all three to operate synchronously.

The driver wheel 53 which extracts energy from the power takeoff cable 27 is journalled to rotate freely on the distributor shaft 55 and is interconnected to counterwound springs 63 which engage the shaft through fixed collars 65 and drive it with an alternating counter rotating motion. The springs 63 rotate the shaft and power the timing pulleys 59 which synchronize the throw over arms 21 and the flip-flop pulley 35. A pair of counterbalance springs 67 are provided extending between the inside of the top of the doghouse support structure and the free ends of the throw over cranks 21 in the wire transport mechanism. These are counterforce springs selected by experimentation to ideally zero out or cancel the dynamic mass of the wire transport mechanism due to the oscillating or moving parts when the mechanism is in the lowest positions during the cycle.

The driver wheel 53 mounted on the distributor shaft 55, over which the power takeoff cable 27 passes on its way out of the engine, is not pinned to the synchronization shaft 55, but is free to rotate about it like an idler pulley. In doing so, however, it winds up one of two counterwound coil springs 63 which are pinned to it and do communicate with the shaft through two fixed but adjustable collar connections 65 disposed on opposite sides of the driver wheel which the ends of the springs are pinned to. When displacement of the cable 27 causes the driver wheel 53 to rotate, one or the other of these springs 63 is wound up (and the other correspondingly slackened) thereby biasing rotation of the synchronizing shaft 55 in a particular direction. This dynamic storage of energy in the spring subsequently contributes energy to the transfer of the nitinol wires from one bath to the other and to coordinating the operation of the engine.

Two design factors which are important are determined for each sized device of the present invention by trial and error; (1) the period of oscillation of the wire transport mechanism which is primarily a function of mass and the arc of travel of these components (in effect they are an upside down pendulum), and (2) the force with which they are accelerated out of one bath towards the other which is primarily a function of how far the springs 63 are wound up by the driver wheel 53 and the selected force of the counter springs 67.

Energy stored in the springs is returned to the system as the wire transport mechanism leaves the bath, and the only net debit to the power output of the engine is the energy required to overcome friction. All that is required of the counterwound springs 63 is a modest bias in one direction or the other to keep the machine running. Therefore, in principle, only one spring is strictly required to impart that energy. The provision of two springs however makes accomodation of a wide range of "stroke" possible in practice, and that stroke may occur "off center" due to changes in the ideal thermal operating conditions for several known but uncorrelated reasons. The nitinol wire has a preferred range of high and low temperatures for the baths for maximum change of length or "stroke" of the wire so that a variation in the stroke of the machine occurs for changes in either of these temperatures. When the temperatures are not those which create the optimum stroke, it is referred to as an "off center" stroke. The optimum stroke is selected by measuring output of the machine and adjusting the stroke until the highest power output is attained.

An important design advantage is that beyond the force required to wind up the driver wheel springs 63, the engine offers no constraint to the recovery rate of the nitinol power wire. It is free to elongate, contract, and do work on an external system at any rate and is not constrained to do work on the engine first.

Another important design feature of the invention is that all of the tensile forces generated by the machine during operation are concentrated in the housing or external support framework. As a result, the preferred embodiment of the support structure can be constructed of bent sheet metal which is sufficient to withstand the loads. Except for counterforces opposing the motion of the power takeoff cable (e.g. external load applied to the engine through the doghouse support structure), other chassis parts have very little load bearing function and can be made of relatively lightweight materials.

Further features of the engine design of the present invention are that it (1) substantially uncouples the shape memory effect behavior of nitinol wires (rate and extent of change and shape) from the mechanical requirements of engine operation; (2) reduces parasitic thermal losses associated with water carry-over from bath to bath (by the nitinol wire) to an absolute minimum by rapidly accelerating the nitinol wire out of the baths during transfer; (3) permits simultaneous heating and cooling of the entire lengths of a plurality of nitinol wires by making the approach of the nitinol wire array normal to the surface of the water baths; and (4) can be constructed of lightweight and inexpensive material due to the distribution of forces within the machine and the independence of the load carrying and wire cycling components.

By this structured arrangement, the lever arms on the compression member are maintained substantially in the vertical position and the nitinol wire array is always maintained substantially parallel to the surface of the water baths as described hereinabove.

Because the wires enter the water baths essentially vertically, the nitinol wires "see" the heat or heat sink in groups of units rather than as a single wire at a time in a random manner. This permits the use of a wire mounting support design which if it is fabricated from a normal engineering material will function as a cantilever spring. In profile, this wire holder or loom is basically a hypothetical tapered knife blade which will enter and leave the water bath with a minimum of perturbation and water carry-over.

The forces generated in nitinol wires 19 and communicated through the power take-off cable 27 are substantially focused on the housing 39 supporting the flip-flop pulley 35. Because of the symmetry of the whole system and the fact that the entire system floats around the pivot axis of the flip-flop pulley, there is no preferential torque imposed on the system regardless of the magnitude of the load applied.

Forces within the lever system are balanced out by proportioning the length of the power takeoff (top) end of the primary power levers 15 so that no net torque (bending moment) is applied to the compression member 13 supporting the levers by the contractions of the nitinol wires 19. This is important for two reasons: (a) it permits the wire carrying elements (levers, compression member, etc.) to be made of very lightweight materials to reduce mass transfer energy dissipation, and (b) it isolates the wire carrying components from the forces generated during the power cycle such that except for one purely compressive force exerted on the compression member, the wire carrying portion of the machine does not "know" if it is carrying one nitinol wire or one thousand. The wire cycling portions of the machine are independent stresswise, and mechanically, from the power takeoff portion of the machine. This makes for a very lightweight and responsive design of the wire cycling portion of the machine, and a significant reduction in mass transfer as the machine operates to do work.

It will be seen from the foregoing description of the preferred embodiment of the present invention that all objects and advantages claimed have been attained. While the method and apparatus of the present invention have been described in considerable detail, many modification improvements of the present invention should be obvious to one skilled in the art. Therefore, it is not to be limited to the details as set forth herein except as may be necessitated by the appended claims.

I claim:

1. A linear output nitinol engine comprising
   an external support framework for said engine including a pair of parallel fluid baths in the lower end thereof and an internal bridge structure,
   a wire transport mechanism including a pair of pivot blocks secured to the opposite ends of a compression member, a pair of identical linkage levers journalled between each of their ends at the same pivot points to each of the pivot blocks, a loom secured to the lower ends of each of said pair of linkage levers, a multiplicity of nitinol wires strung between said looms, and a power takeoff block secured to the top ends of each of said pair of linkage levers,
   a pair of throw over arms supporting the opposite ends of said compression member, said throw over arms journalled to reciprocate the looms and wires disposed on the lower ends of said parallel linkage levers into and out of said parallel baths,
   a pulley journalled in a flip-flop supporting bracket mounted on said bridge structure and arranged to reciprocate in a manner whereby a tangent line to the top of said pulley continually intersects the power takeoff points on said power takeoff blocks,
   a power takeoff means including a tension member disposed on said above-described tangent line secured between the power takeoff point on one of said power takeoff blocks and said pulley supporting bracket, and a power output cable secured to and extending from the power takeoff point on the other of said power takeoff blocks and around said pulley to said load,
   timing means for synchronizing said throw over arms and the flip-flop of said pulley, and
   means for storing energy extracted from said power output cable for biasing the timing means.

2. The linear output nitinol engine of claim 1 wherein said timing means includes a distributor shaft which interconnects the two throw over arms and the flip-flop pulley, said shaft being powered by stored energy.

3. The linear output nitinol engine of claim 2 wherein the distributor shaft of said timing means includes at least three power pulley transmissions or gear trains which interconnect the two throw over arms and the flip-flop pulley, and
   said power output cable is routed over a driver wheel mounted on said shaft, said wheel being journalled in said shaft and interconnected to counterwound springs which engage said shaft and drive it with a counter-rotating motion to power the throw over arms and the flip-flop pulley.

4. The linear output nitinol engine of claim 1 wherein counter force springs are engaged with said throw over arms to balance out the mass of the wire transport mechanism.

5. A linear output nitinol engine comprising
   an external support framework for said engine including a pair of parallel baths in the lower end thereof and an internal structure,
   a wire transport mechanism including a pair of pivot blocks secured to the opposite ends of a compression member, a pair of identical linkage levers journalled between each of their ends at the same pivot points to each of the pivot blocks, a loom secured to the lower ends of each of said pair of linkage arms, a multiplicity of nitinol wires strung between said looms, and a power takeoff block secured to the top ends of each of said pair of linkage levers,
   a pair of throw over arms supporting the opposite ends of said compression member, said throw over arms journalled to reciprocate the looms and wires disposed on the lower ends of said parallel linkage members into and out of said parallel baths,
   a pulley journalled in a flip-flop supporting bracket mounted on said bridge structure between said linkage levers and above said compression member midway between said baths and arranged to counter rotate in a manner whereby a tangent line to the top of said pulley continually intersects the power takeoff points on said power takeoff blocks,
   a power takeoff means including: a tension member disposed on said above-described tangent line secured between the power takeoff point on one of said power takeoff blocks and said pulley supporting bracket, and a power output cable secured to and extending from the power takeoff point on the other of said power takeoff blocks and around said pulley to said load, a timing means for synchronizing said throw over arms and the flip-flop of said pulley including a distributor shaft having at least three pulley transmissions or gear trains which interconnect the two throw over arms and the flip-flop pulley, and said power takeoff cable being routed over a driver wheel journalled on said shaft, said wheel being interconnected to counterwound springs which engage said shaft and drive it with a counter-rotating motion to power the throw over arms and the flip-flop pulley, and counter force springs engaged with said throw over arms to balance out the mass of the wire transport mechanism.

* * * * *